Aug. 6, 1935.　　　B. L. NEWKIRK　　　2,010,698
TESTING HERMETICALLY CLOSED CORES FOR MERCURY BOILERS
Filed Dec. 29, 1932
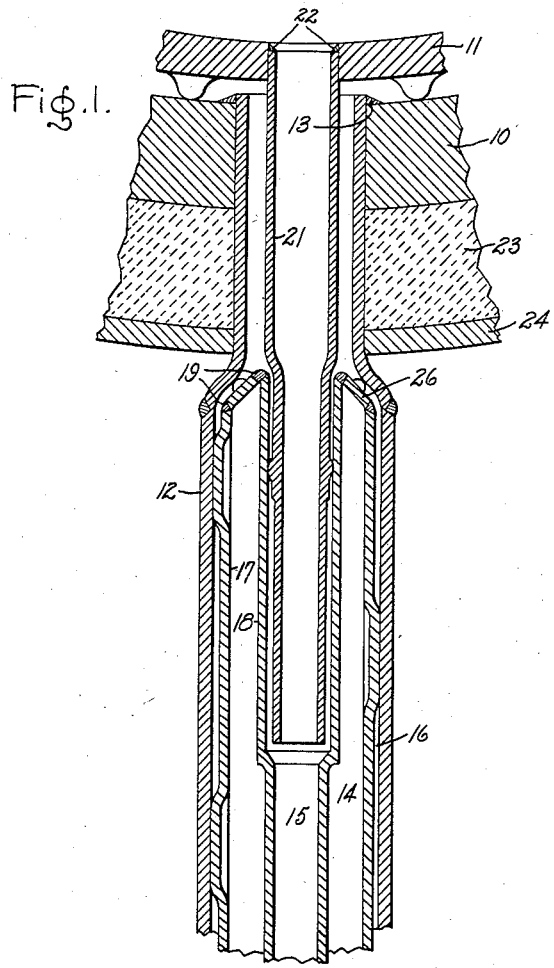
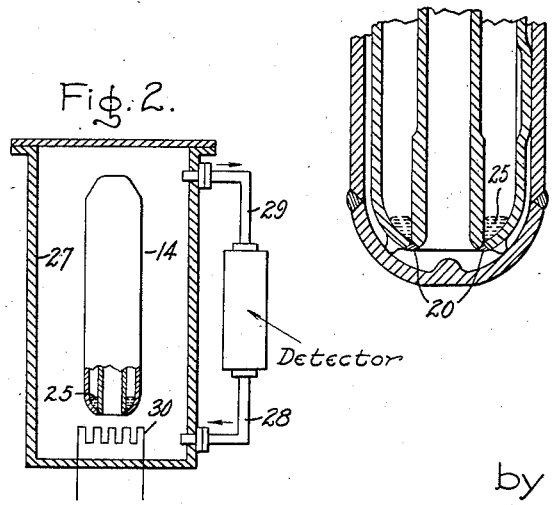
Inventor:
Burt L Newkirk,
by　　　
His Attorney Patented Aug. 6, 1935

2,010,698

UNITED STATES PATENT OFFICE 2,010,698

TESTING HERMETICALLY CLOSED CORES FOR MERCURY BOILERS

Burt L. Newkirk, Schenectady, N. Y., assignor to General Electric Company, a corporation of New York Application December 29, 1932, Serial No. 649,353

4 Claims. (Cl. 73—51)

The present invention relates to testing hermetically closed cores forming a part of the fluid heating and circulating tubes for mercury boilers.

The object of the invention is to provide an improved method of testing a hermetically closed core to insure complete air-tightness thereof.

For a consideration of what I believe to be novel and my invention, attention is directed to the following description and the claims appended thereto in connection with the accompanying drawing which forms a part of my specification.

In the drawing Fig. 1 shows an arrangement for heating and circulating fluid in a mercury boiler, and Fig. 2 shows diagrammatically a part of the structure while being tested in accordance with my invention.

The structure comprises a drum 10 for containing liquid to be evaporated. A baffle plate 11 is arranged in the interior of the drum in spaced relation to the lower wall of the drum. Connected to the drum is a fluid heating and circulating tube which comprises an outer or main tube 12 welded to the drum as shown at 13 and a core 14 having an inner passage 15 and defining with the outer tube a passage 16. The core is made of an outer and an inner tubular member 17 and 18 respectively welded together at their upper and lower ends as indicated at 19 and 20 respectively. A tubular member 21 fastened to the baffle plate by a weld 22 serves for conducting liquid from the space above the baffle plate to the passage 15. This liquid is heated and partly evaporated in the space or passage 16 defined between the core and the outer tube and returned to the drum. The drum is covered on its outer surface with lagging 23 held in position by a cover 24. The structure is more fully described in the copending application of Coulson, Serial No. 478,399, filed Aug. 28, 1930.

The present application relates specifically to the core 14 of the tube which as above described serves to define a passage 15 for the liquid and a passage 16 for the liquid and the vapor. Another important function of the tube is to provide a means of low heat conductivity between the two passages 15 and 16. For proper operation of mercury boilers it is necessary to cause a rapid circulation of fluid in the fluid-heating and circulating tubes. The rate of circulation is a function of the drop in temperature between the fluid in the down-passage 15 and the fluid in the up-passage 16. To minimize the amount of heat directly transmitted from passage 16 to passage 15 a double-walled core is provided which is hermetically closed and filled with a substance such as air of low heat conductivity.

In accordance with my invention I provide in the hermetically closed space defined by the core a substance which can easily be detected in case the core leaks. In manufacturing a core of the type above described I provide a substance, preferably a volatile substance, in the space of the core prior to the sealing or closing of the core and test the sealed core to find out whether any leakage of the substance through the walls of the core takes place.

In Fig. 1 a substance 25, such as mercury, is shown within the space of the core. The substance is placed in the core before the annular member 26 at the upper end of the core is welded thereto.

In Fig. 2 I have shown an arrangement for testing a core for leakage. The core 14 is placed into a chamber 27. Connected to this chamber by means of conduits 28 and 29 is an apparatus or detector sensitive to vapor escaping from the hermetically closed space of the core. If mercury is used as a testing or leakage-indicating substance 25 for the core I may use a detecting apparatus such as that described in the copending application, Serial No. 642,895 of C. W. Hewlett, filed Nov. 16, 1932.

In many cases a core is fluid-tight at room temperature but may leak at its operating temperature which is in the order of 1000° F. For this reason it is preferable to test the core at its intended operating temperature. This may be accomplished by providing a heating means such as an electric heating element 30 in the test chamber. During testing the core is heated preferably to its operating temperature. The air or like gas contained in the test chamber is then circulated through the detector by means of a pump forming a part of said detector, the air or like gaseous substance filling the chamber being conducted through conduit 29 to the detector and discharged therefrom through conduit 28 to the chamber. If the core leaks, vapor of the mercury contained in the core mixes with the air or gas in the chamber and is circulated through the detector where it is detected.

With my invention I have accomplished a simple and reliable method of testing hermetically closed structures, particularly the cores of the liquid heating and evaporating tubes for mercury boilers.

What I claim as new and desire to secure by Letters Patent of the United States is,—

1. In the manufacture of mercury boilers comprising a tube having a core which defines a space hermetically closed by welding, the method of testing the cores for leakage comprising inserting a small amount of mercury into the space of the core prior to the sealing of the core, and placing the sealed core into a closed chamber connected to an apparatus for indicating mercury vapor escaping from the hermetically closed space of the core, said chamber being heated to a temperature of the order of the normal operating temperature of the core.

2. In the manufacture of mercury boilers comprising a tube having a core which defines a space hermetically closed by welding, the method of testing the cores for leakage comprising placing a small amount of a substance into the space of the core prior to the sealing of the core, placing the sealed core into a closed chamber connected to a detector for such substance, and heating the core to its intended operating temperature to cause evaporation of said substance for detecting any substance escaping at the operating temperature from the hermetically closed space of the core.

3. An apparatus for testing a device of the type described forming a hermetically closed space containing a volatile substance, said apparatus comprising a hermetically closed chamber, means for heating the chamber and a conduit including a detector connected to the chamber for detecting gases escaping from the device to be tested, said conduit having one end connected to a lower portion of the chamber and another end connected to an upper portion thereof.

4. A core for mercury boiler tubes comprising two substantially concentrically arranged spaced tubular members made of steel, welds uniting the end portions thereof, and a small amount of mercury contained in the space defined between the members.

BURT L. NEWKIRK.